United States Patent Office

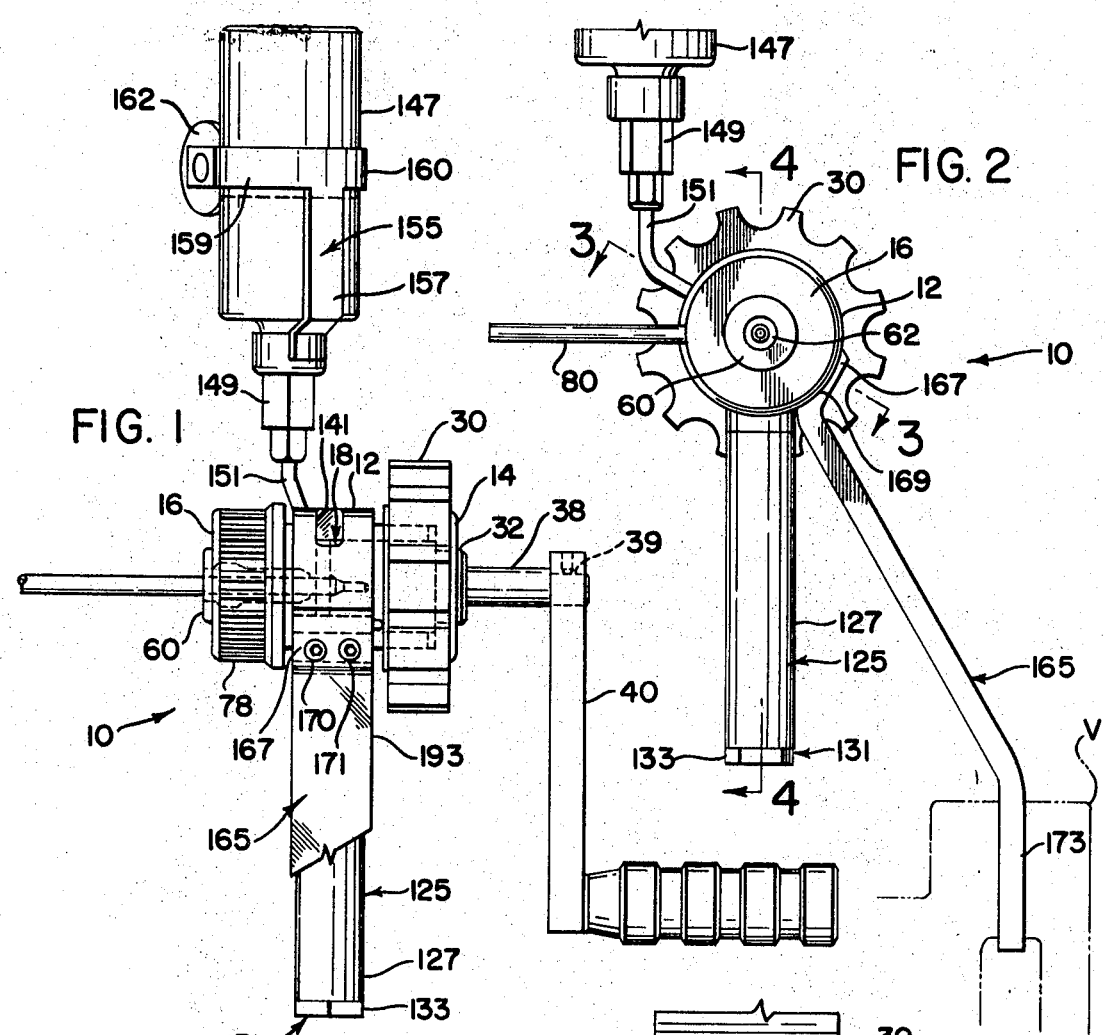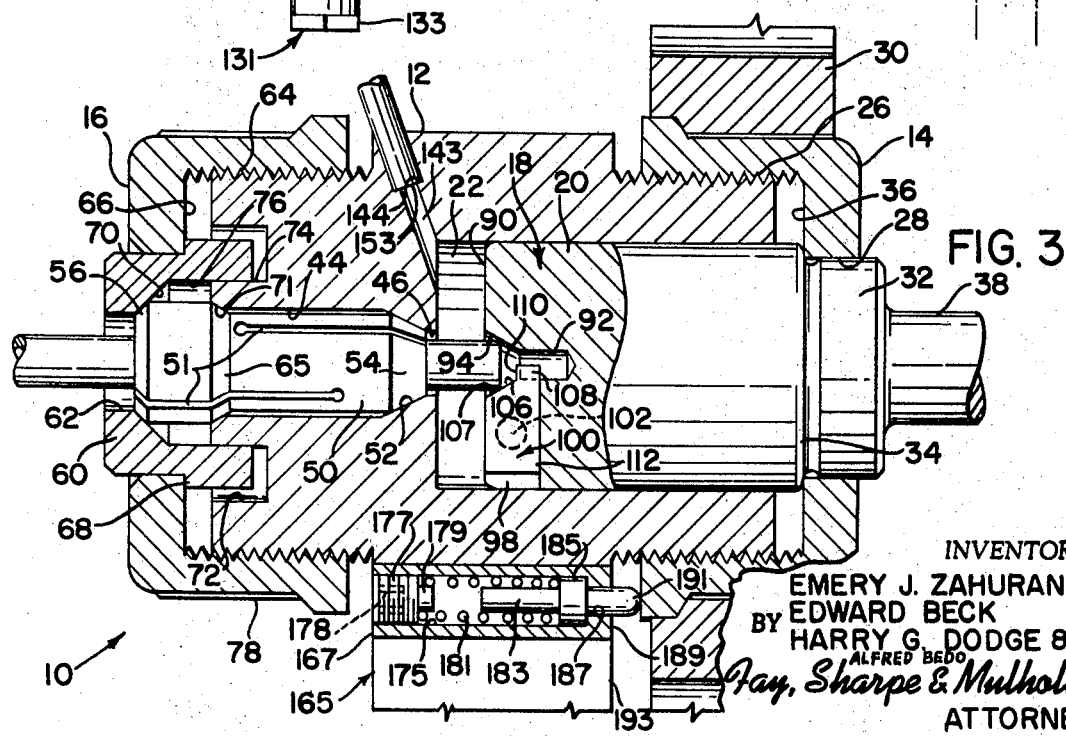

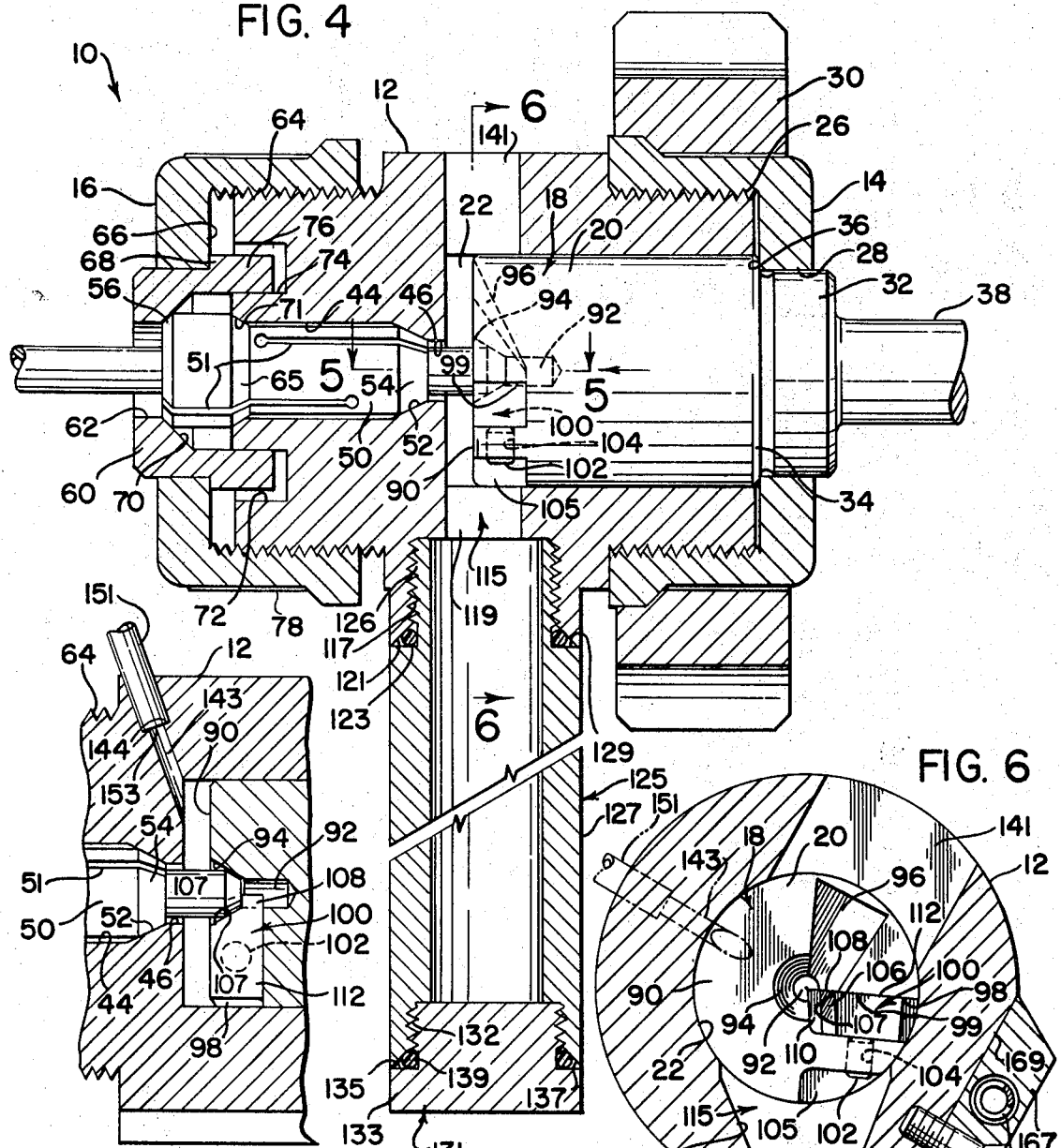
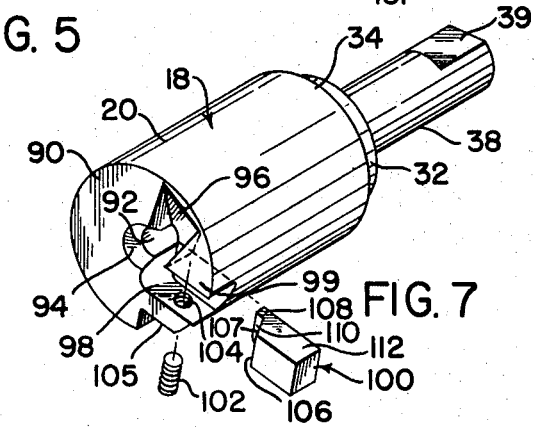

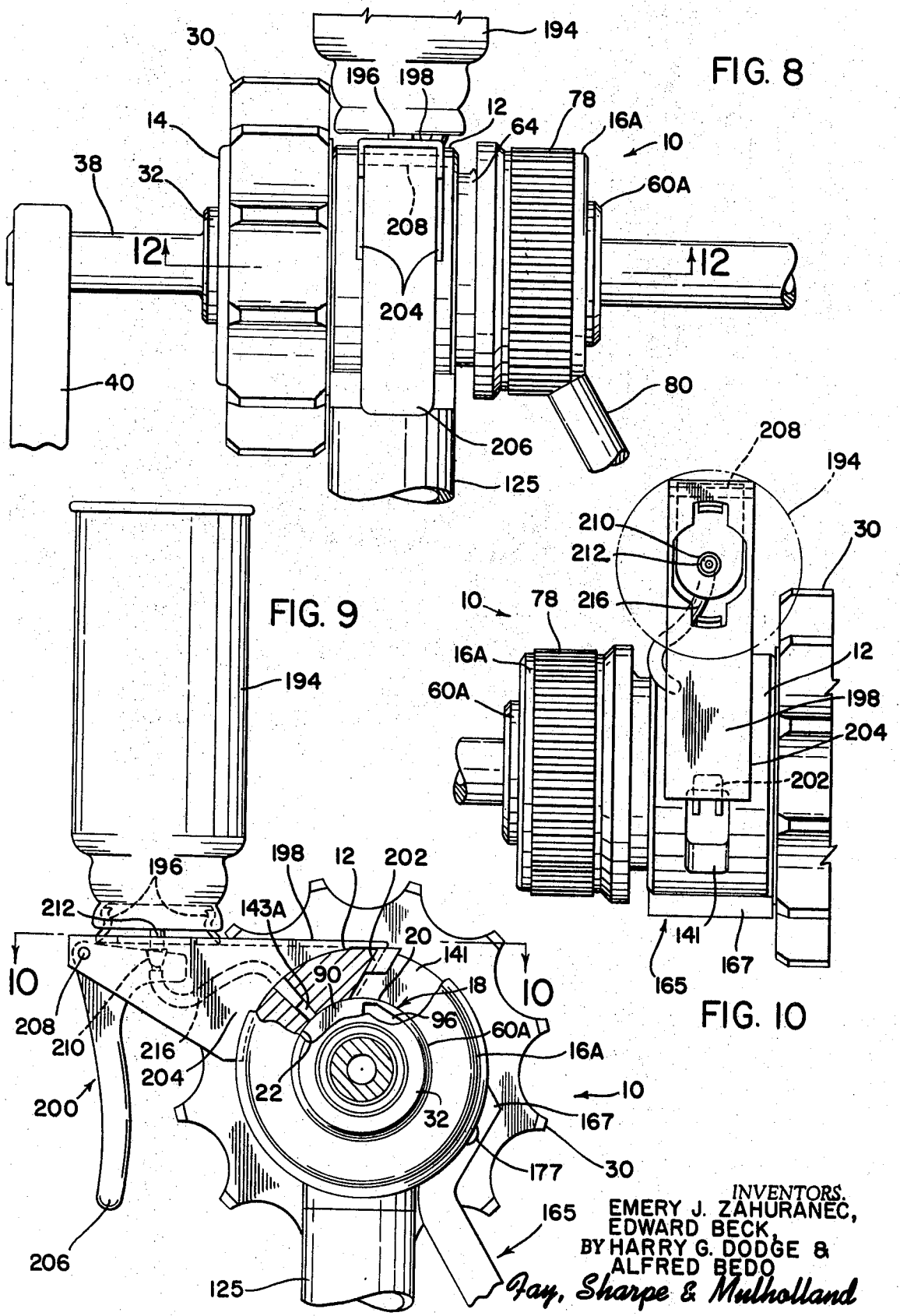

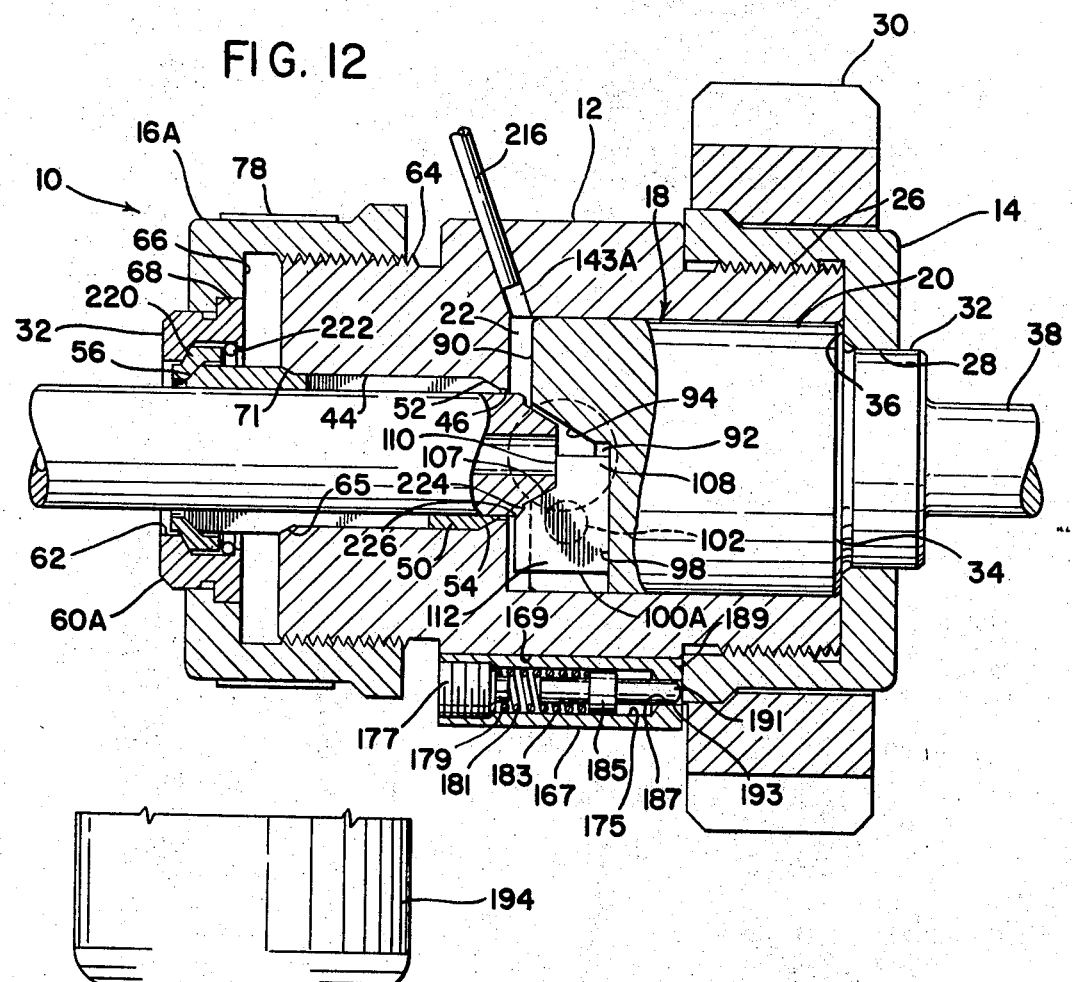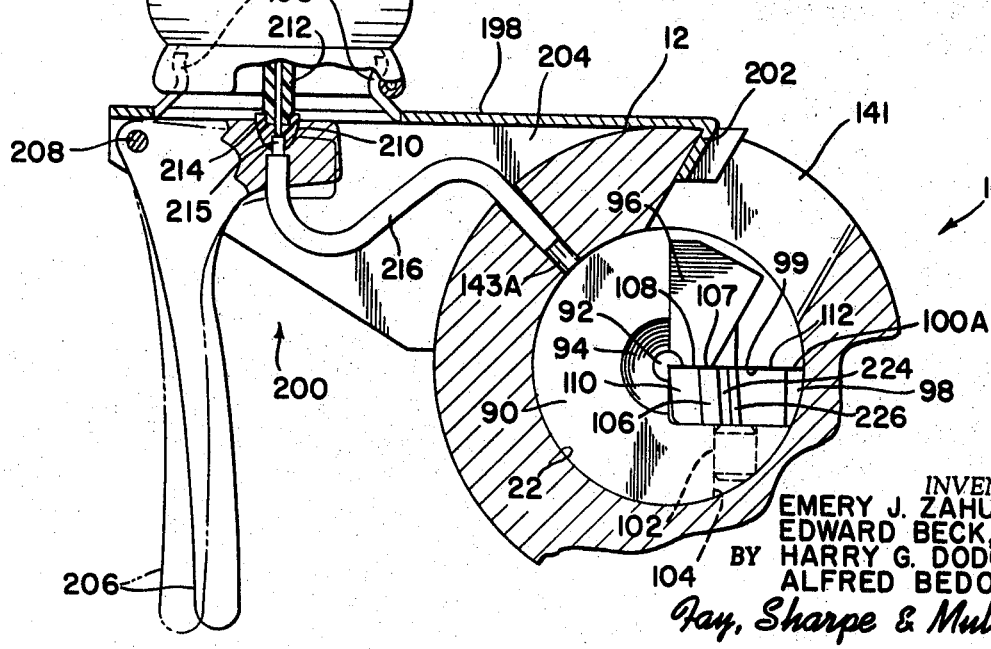

3,537,341
Patented Nov. 3, 1970

---

3,537,341
CUTTING TOOL
Emery J. Zahuranec, Solon, Edward Beck, Cleveland Heights, Harry G. Dodge, Painesville, and Alfred Bedo, Walton Hills, Ohio, assignors to Sno-Trik Company, Solon, Ohio, a corporation of Ohio
Continuation-in-part of application Ser. No. 746,465, July 22, 1968. This application June 23, 1969, Ser. No. 843,274
Int. Cl. B23b 5/16
U.S. Cl. 82—4
22 Claims

ABSTRACT OF THE DISCLOSURE

A cutting tool for producing a chamfer on the end of a workpiece such as a tube or rod. The tool comprises a hollow body with a cutter holder journalled within its central cavity which has a portion extending therefrom for imparting axial and rotational movement thereto. A nut threadedly received on said body engages and surrounds the portion of the cutter holder extending from said cavity to impart limited axial movement thereto. Rotation of the cutter holder is accomplished by a crank affixed to said extension. A collet is mounted in the opposite end of the body cavity to receive and hold a workpiece in cutting position within a central opening in the end of the cutter holder. A cutter projects from a cutter pocket which intersects the central opening. The cutter pocket has a cutter reference plane to locate the cutter accurately relative to the workpiece. The central opening of the cutter holder includes a generally frusto-conical workpiece support surface portion extending for approximately 120° to 270° of the circumference of the opening and an intersecting chip pocket to permit movement of chips radially away from the cutting area. Openings on the side of the body intersect the central cavity adjacent the cutter holder to permit introduction of a cutting lubricant, visual inspection of the cutting operation and the removal of chips from the chip pocket. A special bracket rigidly fastened to the exterior of the body holds the tool during the cutting operation. The proper depth of cut is insured by a gauge means and stop fastened to the body to gauge the relative axial positions of the nut driving the cutter holder and the body. The cutter has a distinctive shape which permits its being sharpened by grinding on only one face thereof without changing the angle at which it cuts. means are provided to pass a suitable cutting lubricant from a reservoir to the cutting area.

BACKGROUND OF THE INVENTION

This application is a continuation-in-part of our copending application Ser. No. 746,465, filed July 22, 1968 for a cutting tool, now abandoned.

This invention relates to a cutting tool for producing a chamfer on the end of tubes, rods or other workpieces, and particularly in producing a frusto-conical shape on the end of thick-walled tubing.

Tube fittings of a conventional design ordinarily have been employed with tubing made of a deformable material so that the tubing may be connected and sealed to the fitting. Exemplary fittings of this type are swage fittings in which swaging of the tubing material occurs so that the tubing is firmly gripped by the fitting. With the advent of high pressure applications, however, it has become necessary to employ thick-walled tubing formed from harder materials such as stainless steel. It is readily apparent that tubes made of these harder materials are more difficult to deform, with the result that it has been difficult to obtain good connections and seals between them with conventional types of fittings.

It is an object of this invention to provide a tool which will adapt a tube end for use with a tube fitting.

More particularly, it is an object of this invention to provide a tube coning tool in which the end of a length of tubing is essentially faced and chamfered to provide a complimentary surface for engagement with a tapered surface of a tube fitting body to form the primary seal therewith.

The invention contemplates a tube coning tool of simplified design which cuts and faces a tube end and provides it with an accurate chamfer to create a precise sealing taper. The tool is specifically designed and adapted to be portable for use in the field by installers of high pressure fluid systems with a minimum of maintenance. Because of the design of the cutter and its mounting pocket, the tool produces a chamfer on a tube end which, even after a reduction of cutter thickness by sharpening, is at the same angle to the axis of the workpiece each time.

BRIEF DESCRIPTION OF THE INVENTION

The coning tool of the invention comprises a hollow body having a central cavity with a cylindrical internal bearing surface. The cylindrical bearing surface has a cutter holder journalled within its central cavity for axial and rotational movement relative thereto. A portion of said cutter holder extends outwardly from said cavity. An apertured nut threadedly received on said body engages a shoulder on the portion of the cutter holder extending from said cavity to impart limited axial movement thereto. Rotation of the cutter holder is accomplished by a crank affixed to a reduced diameter portion of said cutter holder which extends through and beyond the nut aperture.

A collet is mounted on the end of the tool body cavity opposite the crank to receive and hold the workpiece and to present an end thereof against a cutter. A cutter pocket having a cutter reference plane holds a cutter which projects into a central opening in the end of the cutter holder. The central opening has a generally frusto-conical workpiece support surface portion of approximately 120° to 270° of its circumference and an intersecting chip pocket to permit movement of chips radially away from the cutting area. Openings on the side of the body intersect the central cavity adjacent the cutter holder to permit introduction of a cutting lubricant, visual inspection of the cutting operation and the removal of chips from the chip pocket. A special bracket rigidly fastened to the exterior of the body holds the body in fixed position during the cutting operation. To insure the proper depth of cut, a gauge means and stop is fastened to the body for the engagement with the nut to gauge the proper relative axial positions of the cutter holder and body. The cutter has a distinctive shape which permits its being sharpened by grinding on only one face thereof. This prevents a change of angle when the cutter is replaced in the cutter pocket against the cutter reference plane for further cutting operations.

It is preferable to orient one of the openings in the side of the body upwardly, so that visual inspection of the cutting operation can be made easily. A second opening is oriented downwardly, so that by means of gravity the chips will naturally fall out of the cutting area and through the wall of the body. An additional opening through the wall of the hollow body in the area of the cutter is provided for the introduction of a cutting lubricant by means of gravity or a tube connected to a manually operated syringe, flexible container, aerosol can or other simple pump.

The portion of the body within which the collet is mounted for gripping the workpiece is threaded on the exterior thereof. An apertured collet nut is provided in association with these threads to cause radial movement of the collet to grip and release the workpiece for the cutting operation. The apertured collet nut is grooved, knurled or provided with a lever thereon or other means, hydraulic or not, to facilitate its rotational advancement, or retraction, along the threads of the body extension without necessitating the fitting of a wrench or other torque providing device onto tool pads.

On the end of the hollow body opposite the collet, the central cavity has an open end. The exterior of the body adjacent this end is also threaded and a large apertured nut is threadedly engaged therewith to retain the cutter holder in the body with an extension thereof projecting through the nut aperture. The projecting portion of the cutter holder is adapted to impart relative rotation between the cutter and the gripped workpiece. It may be driven by means of a crank, a powered hand tool, or other rotational drive means. Selective rotation of the large nut advances the cutter holder and cutter along the workpiece gripped in the collet as the material removal progresses.

The depth of cut, as determined by the axial movement of the cutter relative to the gripped tube, is determined by the length of the gauge means. The gauge means is preferably a spring biased retractable elongated element which, when fully retracted, has a stop to retard further axial movement of the cutter. Accordingly, the designed chamfer is selected by setting the large nut at an axial position in engagement with the gauge, inserting the tube in the collet until it engages the cutter and securing it in the collet. Cutting is then commenced by turning the cutter holder shaft and advancing the large nut until the nut and cutter have advanced the gauged distance to the stop. In this manner, an accurate length of chamfer and facing on the tube end is provided, together with an angle of taper corresponding exactly to that of the shape of the cutting tool.

Other features and objects will become more apparent upon a complete reading of the following description and perusal of the accompanying drawings.

BRIEF DESCRIPTION OF THE DRAWINGS

FIG. 1 is a side elevational view of the coning tool of the invention with a workpiece in position prior to cutting;

FIG. 2 is a left end elevational view of the tool of FIG. 1;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 4;

FIG. 6 is a cross-sectional view taken along line 6—6 of FIG. 4;

FIG. 7 is an exploded perspective view of the cutter holder and cutter assembly;

FIG. 8 is a fragmentary side elevational view of the coning tool of FIG. 1 showing modified lubricant dispensing apparatus;

FIG. 9 is a fragmentary right end elevational view of the device shown in FIG. 8, partially in section;

FIG. 10 is a fragmentary top view of the tool, showing the support bracket for the lubricant dispensing apparatus, taken along line 10—10 of FIG. 9;

FIG. 11 is a fragmentary elevational view, showing the aerosol can connections used with the apparatus of FIG. 8; and FIG. 12 is a fragmentary cross-sectional view, taken along line 12—12 of FIG. 8 showing a modified collet driving insert, a modified cutter holder and a modified cutter.

PREFFERED EMBODIMENTS

A cutting tool constructed according to the principles of this invention is illustrated in its preferred forms in the drawings and is generally designated by the numeral 10. The cutting tool 10 is made up of major components which include a hollow body 12 having a large first, or cutter advancing nut 14 and a second, or collet nut 16 exteriorly mounted on threads adjacent the ends thereof. A cutter holder 18 having an enlarged bearing portion 20 is journalled in an enlarged central cylindrical cavity portion 22 of the body 12 for rotation relative thereto.

On the exterior of the body 12 adjacent the cutter holder cavity 22 are first threads 26 with which those of the large nut 14 are engaged. The nut 14 has a central aperture 28 and may be made up in two parts, as illustrated, such that the internally threaded and apertured portion has a large exteriorly grooved hand wheel 30 press fitted on its outer periphery to facilitate manually turning the nut 14 on the threads 26.

The cutter holder 18, in addition to being journalled within the body cavity 22, has a cylindrical surface 32 journalled within the aperture 28 of the nut 14. The cylindrical surface 32 is of a diameter smaller than the diameter of the cylindrical body portion of the cutter holder 18 and is separated therefrom by a radially directed shoulder 34. The nut 14 has an inner surface 36 in the flange surrounding opening 28 which engages the shoulder 34 of the cutter holder to provide the force for the axial driving of the cutter holder by the nut 14.

In addition to the cylindrical surface 32, the cutter holder 18 has an integral reduced diameter extension portion 38 which projects outwardly therefrom. The extension portion 38 has a flat 39 to which is attached a crank 40 to provide the rotational drive of the cutter holder 18 within the body cavity portion 22.

On the opposite end of the body 12 is a collet receiving cavity portion 44. The portion 44 is communicated by means of an opening 46 with cavity portion 22 and cooperates with a collet 50 in a manner to be explained. The opening 46 has a frusto-conical surface portion 52. The collet 50 is a split hollow ferrule type which has a plurality of longitudinal slots 51 extending from each end thereof to points intermediate its ends. The inner end of collet 50 has a tapered nose 54 which cams against the frusto-conical portion 52 to create a radially inwardly directed force to grip the workpiece. The outer end of the collet 50 has a frusto-conical surface portion 56 for engagement with a collet driving insert member 60. The insert 60 is an annular member with a central aperture 62 therethrough to permit the workpiece to extend into the hollow interior of the collet 50.

The collet receiving end of the body 12 has second exterior threads 64 with the collet 16 in engagement therewith for rotational and axial movement. The nut 16 drives the collet-driving insert member 60 by means of its interior flanged portion 66 acting against a peripheral shoulder 68 on the insert. The frusto-conical portion 56 of the collet receives both a radial and an axial component of force by means of an interior annular tapered surface 70 on the insert member 60 which surrounds the opening 62 thereof. Thus, collet 50 is moved axially and cammed into gripping engagement with the workpiece as nut 16 drives insert 60 against surface 56 while surface 54 of collet 50 cams inwardly along surface 52 of the body. In addition, at the mouth of cavity 44, a tapered frusto-conical surface 71 engages an annular tapered shoulder surface 65 intermediate the ends of the collet to facilitate contraction thereof.

An annular recess 72 is provided in the end of the body adjacent to and concentric with the cavity portion 44 to provide a cylindrical surface 74 along which the interior cylindrical surface 76 of the collet-driving insert 60 may be guided for aligned axial movement as the collet nut 16 is advanced on the external threads of the body 12. The exterior of the nut 16 is preferably knurled as at 78 to provide for easy manual turning. In addition, a lever member 80 is attached to the nut 16 to provide the requisite torquing without the necessity of engaging and disengaging it with a wrench. Thus, it will be seen that as the coupling nut 16 is threadedly advanced on the body, the workpiece is tightly gripped in the collet at a point spaced from its end such that the end of the workpiece extends into the cavity portion 22 through opening 46.

The details of the structure of collet 50 are shown in U.S. Pat. No. 2,228,685.

The cutter holder 18 and its large cylindrical journalled portion 20 have an end face 90 in which a central opening 92 is provided. The central opening 92 of the illustrated embodiments have a frusto-conical work holding portion 94 around approximately 120° to 270° of its mouth. The central opening 92 is intersected by a chip pocket 96 and a cutter pocket 98. The cutter pocket 98 is defined in part by a flat cutter reference plane 99 against which a cutter 100 is mounted.

The cutter 100 is secured against the cutter reference plane 99 by means of a set screw 102 which extends through a threaded opening 104 in the portion 20 of the cutter holder 18. A cutout portion 105 in the exterior of the holder is provided to recess the set screw 102 and prevent its contacting the surface of the body cavity 22 during operation of the tool.

As shown in FIG. 3, the cutter 100 has a distinctive shape which includes a top, or first, flat surface 112, a tapered, or second, flat surface 106 and a third flat surface 110. The cutter extends into the central opening 92 for engagement with the workpiece, with the second flat surface 106 extending at an angle with respect to the axis of the workpiece. The third flat surface 110 is substantially normal to the first flat surface 112 and the cutting edge 107 formed at the junction of the first and second flat surfaces defines an angle of approximately 85°. It is the angle that the cutting edge 107 makes with the axis of the gripped workpiece that determines the angle of the chamfer produced on the workpiece by the cutting operation and this may vary with the materials used or their application. At the inner end of the surface 106, a projection 108 extends radially inwardly towards the workpiece axis. The surface 110 of projection 108 intersects tapered surface 106 of the cutter and acts as the cutting surface for accurately facing the end of the tube.

The distinctive shape of the cutter 100 is such that, when its top surface 112 is ground to sharpen the tool, it can be refastened in the cutter pocket 98 against cutter reference plane 99 in exactly the same position. Sharpening is accomplished by removing a layer of metal of uniform thickness from flat surface 112. This insures that the desired chamfer and face are provided on the workpiece each time, even if the cutter is sharpened between jobs.

The chip pocket 96 is defined by a smooth surface extending from its intersection with the central opening 92 outwardly to end surface 90 adjacent the enlarged bearing portion 20 of the cutter holder 18. The chips are guided radially and axially outwardly by this surface into the central cavity 22. The body 12 has an opening 115 at the lower portion of the body so that the chips, as they move out of the pocket 96 are directed downwardly through the opening 115 into a chip and lubricant reservoir 125.

The opening 115 is counterbored and has internal threads 117 to receive a threaded end of the reservoir 125. Between the threads and the body cavity 22, the opening 115 has a tapered wall portion 119 to guide the chips into the reservoir. At the end of the threads is a frusto-conical mouth 121 for receiving an O-ring seal 123. The end of the reservoir 125 is a reduced diameter portion having threads 126 of a shape and size complimentary to threads 117. The reservoir threads are separated from the body 127 of the reservoir by a shoulder 129. With the reservoir 125 threadedly assembled to the body 12, the O-ring 123 is seated under compression between mouth 121 and shoulder 129 to prevent leakage of lubricant therebetween.

The reservoir body 127 is a hollow cylinder having a threaded cap 131 associated therewith in an internally threaded counterbore 132. The cap has a flange 133 with a radially directed inner shoulder surface 135 which cooperates with a tapered mouth 137 to compress an O-ring 139 to prevent leakage therebetween. The reservoir 125 may readily be removed for emptying chips and lubricant, or if desired the same may be accomplished by removing cap 131.

The body 12 of the tool has an opening 141 through its upper wall portion. The opening 141 is located above the end portion of central cavity 22 in which the cutting operation is performed and its purpose is to permit visual inspection of the workpiece and cutter at all times during the cutting operation.

A smaller opening 143 is provided through the wall of the body 12 to permit the passage of lubricant into the central cavity 22. The opening 143 is preferably located such that it enters the cavity above the workpiece and is directed toward the cutting zone. The outer portion of opening 143 is counterbored to provide a shoulder 144 intermediate its ends.

One illustrated form of lubricant dispenser includes a flexible plastic bottle 147 of a translucent material which permits visual inspection of the level of lubricant in the bottle. A hollow metal adaptor cap 149, having a metal dispensing tube 151 extending therefrom, is threadedly attached to the bottle. Then end 153 of the tube 151 is inserted in the opening 143 until the end abuts shoulder 144 therein. This holds the bottle in dispensing position. The adaptor cap 149 has a metal clamping mechanism 155 welded thereto with a leg portion 157 extending along a portion of the length of the bottle. At the end of the leg portion 157 opposite the cap, two bottle encircling clamping arms 159 and 160 respectively are provided. The ends of arms 159 and 160 can be moved together or apart by a bolt in threaded association with one of the arms and passing through an aperture in the other of said arms to create a squeezing force on the bottle 147 to dispense the lubricant from tube 153 into the cavity 22 through opening 143.

A holding bracket 165 is attached to the body 12 for mounting the tool in a vise. The bracket 165 is a metal strap having a portion 167 angled for attachement to a flat 169 provided on the lower outside of body 12. Two bolts 170 and 171 having hexagonal sockets for applying torque thereto are threadedly engaged in the wall of the body 12 to secure the body to the bracket. The opposite end of bracket 165 has an angled portion 173 for convenient orientation of the cutting tool 10 as it is held in the jaws of a vise V (schematically shown in FIG. 2) during the cutting operation.

The angled portion 167 of the holding bracket 165 has a gauge housing bore 175 located between the bolts 170 and 171 and the end of bracket. The bore 175 is oriented parallel to the axis of rotation of the cutter holder 18 and has a plug 177 threadedly received in the end thereof farthest from nut 14. The plug 177 has a hexagonal torque receiving recess 178 on its outside end and a small cylindrical projection 179 on its inside end. The projection 179 is inserted in the end of a coil spring 181 located within the bore.

An elongated gauging member 183 having an annular flange 185 intermediate its ends has its innermost reduced diameter portion surrounded by the end of spring 181 opposite plug 177. Spring 181 acts on flange 185 to bias the outermost reduced diameter portion outwardly through an opening 187 in the end wall 189 of the bore 175. The exposed end or nose 191 of the member 183 engages the nut 14 as it travels axially along the external threads 26 of the body 12 toward the adjacent side 193 of the bracket 165.

Thus to set up the work, the nut 14 is turned up against the projecting nose 191. The workpiece is placed against the tapered surface 106 and the nut 16 is rotated by means of lever 80 to cause a gripping of the collet 50 of the workpiece in that position. The cutter is then rotated and the nut 14 is turned to keep the cutter and workpiece in engagement with one another while making successive cuts. These operations continue until the nut 14 is stopped by the side 193 of the bracket 165. When this occurs the desired end face and chamfer on the workpiece has been produced.

FIGS. 8–12 illustrate a modified apparatus for injecting lubricant into the cutting area and includes an aerosol can 194 held in inverted position by radially biased prongs 196 which project from the upper surface 198 of a support bracket 200. A hook 202 on one end of the bracket 200 is cooperatively shaped to extend along the surface of the visual inspection opening 141 to lock the bracket in position. Depending sides 204 conform to the shape of the body 12 and a lever means or trigger mechanism 206 is suspended between the sides by a pin 208.

Conventional aerosol cans include a spray nozzle mounted on a nipple. Spraying is accomplished by depressing the nozzle against a spring biased valve in the can which opens to allow flow of liquid propelled by compressed gas through the nozzle.

In this modification of the invention, the conventional nozzle is removed and an apertured bearing cap 210 is placed over the nipple 212 against the conventional shoulder 214 on the nipple. A probe 215 fixed to the trigger mechanism 206 is adapted to extend into the aperture of the cap 210 for conducting the lubricant through the trigger mechanism to a flexible tube 216 when the operator "pulls the trigger." The opposite end of the tube 216 is held in a tapered opening 143A by frictional engagement.

Obviously a modified bearing cap may be provided if desired, having a side opening as opposed to the central opening of the cap 210.

During the cutting operation the operator will usually turn the crank 40 with his right hand and brace himself by grasping the reservoir 125 and bracket 165 with his left hand. The location of the trigger mechanism 206 provides easy actuation by the index finger of the left hand without stopping the rotation of the crank 40 and without moving the left hand. Concurrently the thumb of the left hand is in position to advance the cutter nut 14 by manipulating the hand wheel 30.

FIG. 12 illustrates a modified collet nut 16A and insert 60A. Some cutting operations lend themselves to a different mechanism for aligning the collet 50 and workpiece. The collet itself may be adequate to provide the necessary aligning and in such a situation it is desirable to have a loose fit with the collet driving insert. The insert 60A includes a sleeve 220 for engaging the collet 50, the sleeve being held in place within the insert by a snap ring 222. The loose fit allows the collet to center itself as the collet nut 16A is tightened. To accommodate the tool for use with tubing of another size, it is necessary merely to exchange collet 50 for another of appropriate dimension.

The modified cutter 100A of FIG. 12 is shown with one side adjacent the bottom of the central opening 92 in the cutter holder 18. While this arrangement is preferred, it is optional and like structure may be employed as shown in FIG. 3 if desired. The shape of the cutter 100A is slightly different from the cutter 100 and preferably is used with larger sized tubes. It includes a fourth flat surface or shoulder facing surface 224 which extends substantially parallel with the third flat surface 110 and a fifth flat surface 226 which extends substantially parallel with the second flat surface 106. With larger sized tubes it may be desirable to cut a shoulder on the tube and this is the function performed by the surface 224 of cutter 100A.

It will be noted that the annular recess 72 of FIGS. 1–7 has been eliminated in FIG. 12 as it would serve no useful function with the modified insert 60A.

As is obvious, any or all of the modifications illustrated in FIGS. 8–12 may be incorporated into the structure of FIGS. 1–7, as described. It should be further understood that the tool may be readily adapted for use with any one of a variety of different tube sizes, merely by exchanging the illustrated collet for one of another size, and by an appropriate change of cutters.

Finally, it will be recognized that while the present disclosure has been concerned with the task of cutting frusto-conical surfaces on heavy-walled tubing, the tool described is also applicable for use in producing other shapes or forms on other items.

For ease of description, the principles of the invention have been set forth in connection with but a few illustrated embodiments. It is not our intention that the illustrated embodiments nor the terminology employed in describing them be limiting inasmuch as variations from these embodiments may be made without departing from the spirit of the invention. Rather we desire to be restricted only by the scope of the appended claims.

The invention claimed is:

1. A cutting tool which includes in combination an elongated hollow body having a cylindrical internal bearing surface,
   an elongated cutter holder having a cylindrical journal portion for rotational and axial movement relative to said body within said bearing surface,
   an end of said cutter holder having an opening defined in part by a frusto-conically shaped wall portion extending for approximately 120° to 270° of the circumference of the opening in an arc coaxial with said cylindrical journal portion,
   said opening being intersected by a cutter pocket having a cutter reference plane,
   said cutter pocket and said opening being intersected by a chip pocket,
   a cutter secured in said cutter pocket against said cutter reference plane and projecting into said central opening,
   means on said body to position an end of an elongated workpiece within said central opening coaxially with said frusto-conically shaped wall portion to engage said cutter,
   and means to rotate and axially move said cutter holder relative to said body and said workpiece.

2. The cutting tool of claim 1 in which the hollow body has at least one open end, the hollow body exterior has first threads adjacent said one open end, a first apertured nut is threadedly engaged on said first threads, the means to rotate said cutter holder extends through the apertured nut and the cutter holder is axially advanced along said cylindrical internal bearing surface by said nut.

3. The cutting tool of claim 2 in which the end opposite said one open end includes a second open end and said means on said body to position an end of an elongated workpiece is a hollow collet means therein.

4. The cutting tool of claim 3 in which the hollow body exterior has second threads adjacent said second end, and a second apertured nut is threadedly engaged on said second threads to create selective radial workpiece gripping movement of said collet.

5. The cutting tool of claim 4 including means associated with said second apertured nut for aligning the collet in operating position.

6. The cutting tool of claim 4 in which the collet includes a hollow ferrule having slots parallel to its axis which define a plurality of gripping portions.

7. The cutting tool of claim 6 in which the collet includes a frusto-conical camming surface which moves the plurality of gripping portions radially inwardly when said second apertured nut is turned up on said second threads.

8. The cutting tool of claim 1 in which a chip reservoir is provided on said body in communication with said chip pocket.

9. The cutting tool of claim 8 in which at least a portion of said chip reservoir is removable from said body to permit removal of chips from said reservoir.

10. The cutting tool of claim 1 which includes in combination a fluid cutting lubricant dispenser in communication with the inside of said cylindrical internal bearing surface adjacent said cutter by means of a passage in the wall of said body.

11. The cutting tool of claim 10 in which the cutting lubricant dispenser is supported on a frame attached to the body.

12. The cutting tool of claim 11 wherein the cutting lubricant dispenser is an aerosol can attached to said frame and actuated by lever means.

13. The cutting tool of claim 12 wherein the lever means is attached to said frame.

14. The cutting tool of claim 10 in which the cutting lubricant dispenser is a flexible plastic container having mounted thereon an adapter cap with a rigid hollow tube extension, said tube extension being of size and shape to telescopingly fit into said passage to support said container in inverted position in fluid communication with said passage.

15. The cutting tool of claim 14 in which said adapter cap and dispenser include means for squeezing said container to thereby reduce the volume of said container to aid dispensing of said lubricant.

16. The cutting tool of claim 1 in which the cutter is a body fixed in said cutter pocket having a first flat surface in face to face engagement with the cutter reference plane, a second flat surface adjacent the inner end of the cutter pocket oriented at an angle with respect to the axis of rotation of said cutter holder, the first and second flat surfaces intersecting at a cutting edge, and a third flat surface normal to said first flat surface and intersecting the innermost end of said second flat surface at an angle such that third flat surface is normal to the axis of rotation of said cutter holder, whereby the angle between said cutting edge and third flat surface defines the angle cut between the accurately faced end of said workpiece and the chamfer cut on said workpiece.

17. The cutting tool of claim 16 in which the side of said cutter opposite said first flat surface is parallel to said first flat surface such that severing a piece of uniform thickness from said first flat surface and maintaining its parallelism with the side opposite will sharpen said cutter without changing the angle of facing and chamfering produced by said cutting edge and third flat surfaces during cutting.

18. The cutting tool of claim 17 including a fifth flat surface parallel with said second flat surface, a fourth flat surface extending between the second and fifth surfaces and parallel with said third flat surface whereby said fourth flat surface is adapted to cut a radially extending shoulder on said workpiece.

19. The cutting tool of claim 1 which includes an opening defining surface extending through the wall of the body to the inside of the cylindrical internal bearing surface adjacent the cutter to permit visual inspection of the cutting operation.

20. The cutting tool of claim 2 which includes a gauge adjacent said first apertured nut comprising,
a housing having a spring mounted therein,
an opening in an end of said housing adjacent said first nut,
an elongated gauging member mounted in said housing with an end thereof projecting from said housing through said opening, said spring engaging and biasing said guaging member to a fully extended and first apertured nut engaging position through and beyond said opening while permitting retraction of said gauging member into said housing for a distance equal to the distance said first nut must be advanced to provide the proper axial movement of the cutter holder in providing the desired length of chamfer.

21. The cutting tool of claim 20 in which the housing having the spring mounted therein is a portion of an elongated holding bracket affixed to said body to provide a means of securing said tool in a vise.

22. The cutting tool of claim 1 in which an elongated holding bracket is affixed to said body to provide a means of securing said tool in a vise.

References Cited

UNITED STATES PATENTS

| 2,900,858 | 8/1959 | Gauthier et al. | 82—4 |
| 3,088,352 | 5/1963 | Tanner | 82—4 |

LEONIDAS VLACHOS, Primary Examiner

U.S. Cl. X.R.

77—55